2,885,449
Patented May 5, 1959

2,885,449

MANUFACTURE OF 1,1,1,2,4,4,4-HEPTAFLUORO-3-MONOCHLOROBUTENE-2

Richard F. Stahl, Madison, and Cyril Woolf, Morristown, N.J., assignors to Allied Chemical Corporation, a corporation of New York No Drawing. Application December 13, 1957
Serial No. 702,523

4 Claims. (Cl. 260—653.4)

This invention is directed to process for manufacture of 1,1,1,2,4,4,4-heptafluoro-3-monochlorobutene-2

$$CF_3CF:CClCF_3$$

a colorless liquid having a boiling point of 32° C. at atmospheric pressure.

It has been proposed to make $CF_3CF:CClCF_3$ by reaction of hexachlorobutadiene with HF and antimony salts. With regard to fluorinating processes in general utilizing the antimony route, operating procedures are subject to many recognized disadvantages among which are the corrosiveness of the antimony halide, the difficulty of operation involved by reason of the use of liquid reactant as distinguished from a solid catalyst, and the relatively high volatility of antimony halides thereby giving rise to formation of products which contain small amounts of the fluorinating agent as impurity which is not easily removed. While practicable, the disadvantages of fluorination operations involving use of antimony salts are apparent to those skilled in the art.

1,1,1,4,4,4-hexafluoro-2,3-dichlorobutene-2

$$CF_3CCl:CClCF_3$$

a colorless liquid having a boiling point of 67° C., is a known compound. Metathetical replacement of a chlorine atom, attached to a doubly bonded carbon by HF is notably difficult in any circumstance. Further, where such a chlorine atom is attached to doubly bound carbon atom, which is also adjacent a deactivating $CF_3$ group, one would not except chlorine replacement by HF to occur. To the contrary, we have found that HF will react with $CF_3CCl=CClCF_3$ in vapor phase to form $$CF_3CF:CClCF_3$$

provided the reaction is carried out in the presence of a certain catalyst, and under certain reaction conditions.

A major object of the present invention lies in the provision of a solid catalyst, gas-phase method for making $CF_3CF:CClCF_3$ by HF fluorination of $$CF_3CCl:CClCF_3$$

starting material. The invention comprises the selection of a certain starting material, and the conjunctive relation of the same with a zirconium salt catalyst and certain reaction conditions.

We find that certain zirconium tetrafluoride-activated carbon materials possess the properties of effectively promoting reaction of anhydrous HF and $$CF_3CCl:CClCF_3$$

starting material by an easily controllable, all gas-phase, truly catalytic procedure in accordance with which the desired $CF_3CF:CClCF_3$ product may be made in good yields. Further, we find that these zirconium tetrafluoride-activated carbon catalysts, under the reaction conditions hereindescribed, show no discernible tendency to promote reaction which would form saturated end products.

The catalytic material utilized in practice of the invention may be made for example by impregnating activated carbon, of say 4–15 mesh size granulation, with an aqueous solution of a zirconium salt, such as zirconyl chloride $ZrOCl_2$, and drying at 125–200° C. in an inert gas stream such as nitrogen. Then the material is gassed with HF to convert the zirconium to $ZrF_4$, temperatures being maintained above 125° C. and preferably at about 150–200° C. Water and HCl formed during the reaction pass off in the vapor state. Gassing with HF is continued until tail gases of the HF gassing operation indicate that evolution of HCl and water has ceased.

Raw material serving as the source of zirconium may be any zirconium salt which is soluble in vaporizable solvent and which reacts with HF to form $ZrF_4$ and a byproduct vaporizing at the temperature of HF gassing. Thus, materials such as $ZrOCl_2$, $ZrO(NO_3)_2$, and $ZrOCO_3$, $ZrO(OH)_2$ and also anhydrous $ZrCl_4$ may be used. While aqueous hydrochloric acid and water are the more desirable solvents, other suitable solvents may be employed. For example, a catalyst containing 20 weight parts of $ZrF_4$ per 100 parts of Columbia 6G carbon may be made by dissolving 28 grams of substantially anhydrous $ZrCl_4$ in 200 cc. of 10% hydrochloric acid, adding the liquid to 100 grams of the carbon, evaporating to dryness, transferring the impregnated carbon into a tubular nickel reactor heated by electric furnace, and passing preferably anhydrous HF into the impregnated carbon maintained at about 150–200° C. until evolution of water and HCl ceases.

In making the catalyst, any of the commercially available activated carbons may be employed, e.g. Columbia 6G carbon, Columbia SW carbon, or Darco carbon. The relative quantities of activated carbon and e.g. zirconyl chloride initially employed may be such as to form an ultimate zirconium tetrafluoride-activated carbon mass which contains desirably a major quantity by weight of activated carbon and a minor quantity by weight of $ZrF_4$. On the other hand, amounts of zirconium salt and activated carbon may be such as to form a final zirconium tetrafluoride-activated carbon catalyst containing as little as about 5% by weight of $ZrF_4$. The catalyst preferably employed in practice of the invention may be considered as a zirconium tetrafluoride on activated carbon mass containing about 5–40% by weight of $ZrF_4$.

Practice of the invention involves subjecting gas-phase $CF_3CCl:CClCF_3$ starting material to the action of gaseous anhydrous hydrogen fluoride in the presence of the hereindescribed zirconium tetrafluoride-activated carbon catalyst in a suitable reaction zone at the elevated fluorination temperatures, and recovering from the reaction zone exit the sought-for $CF_3CF:CClCF_3$ product. Reactions involved may be represented by $$CF_3CCl:CClCF_3 + HF \rightarrow CF_3CF:CClCF_3 + HCl$$

We find that in practice of the invention, reaction temperature should be 425° C. or above. At such temperatures, in the presence of HF and the described catalyst, substantial fluorination is effected at reasonable contact time. Temperatures as high as about 650° C. may be utilized without interfering appreciably with yields or effecting excessive decomposition. Other factors being equal, higher temperatures promote higher degree of fluorination. Generally, preferred temperatures are not higher than about 525° C. to guard against incipient fragmentation, preferred temperature range being about 425–525° C.

Mol ratio of HF to organic starting material is variable to some extent. Theoretical requirements of HF are one mol or HF per mol of $CF_3CCl:CClCF_3$. In any case, enough anhydrous HF is employed to react with a substantial amount of the starting material to form a substantial quantity of $CF_3CF:CClCF_3$. While more than theoretical quantities of HF may be employed, it is desirable to use quantities of HF which approach but do not substantially exceed stoichiometric proportions. It has been found that, when employing the catalysts described, if the HF molar ratio is increased appreciably above the 1:1 ratio, utilization of HF decreases markedly with insufficient worthwhile increase of product formation. Preferably, a relatively small, e.g. 5–10%, excess of organic starting material over theory requirements should be employed in large scale work.

Contact time may be varied considerably without noticeable disadvantage to high process efficiency. Increasing contact time and reactor temperature result in higher HF conversion and higher conversion of starting material to sought-for product, and lowering contact time and reactor temperature result in lower HF conversion. In general, contact time may lie in the range of 2 to 30 seconds, and preferably in the range of 5–15 seconds. To a substantial extent, contact time, reaction temperature and ratio of reactants are interrelated, and product composition may be varied by alteration of one or more of these factors. Depending upon the starting material used and the product desired, optimum conditions may be determined by test runs.

In general practice, organic starting material and anhydrous HF are vaporized and metered into a tubular reactor packed with catalyst, made of suitable inert material such as nickel, and provided with external heating equipment preferably including automatic means for maintaining given temperatures in the reaction zone. Product recovery may be effected more or less conventionally as in this art. For example, reactor exit gases may be passed into a water scrubber to absorb HCl and excess HF, and to condense the organic products and any unreacted starting material. Organics and water may be separated by stratification and decantation, and after drying and filtering, the organics may be separated and isolated by distillation.

The following typifies practice of the invention. The $ZrF_4$-on-activated carbon catalyst was made substantially as follows: Commercial $ZrCl_4$ was dissolved in water and poured over Columbia 6G activated carbon of 4–15 mesh, the amount of $ZrCl_4$ being about 46% by weight based on the carbon. The mixture was evaporated to dryness and charged into a suitable fluorinator. Temperature was maintained at about 200° C. to drive off residual water, and then the mass was gassed with anhydrous HF at about 200° C. until evolution of HCl ceased. The finished catalyst contained about 25% by weight of $ZrF_4$ and about 75% by weight of carbon. About 500 cc. of such catalyst were charged into a reactor, comprising a one inch I.D. nickel tube about 36 inches long and enveloped substantially throughout its length by an electrical heating unit, and provided at one end with feed inlets and at the other with a pipe connection leading to a recovery unit. Over the course of about 5 hours, about 2.4 mols (48 g.) of gaseous anhydrous HF and about 2.34 mols (552 g.) of vaporized $CF_3CCl:CClF_3$ were metered and fed into the reactor. Mol ratio of HF to organic starting material was about 1:0.97. Throughout the run, internal temperature in the reactor was maintained at about 450° C., and contact time was about 30 seconds. Exit gases of the reactor were passed into an ice-cooled water scrubber in which HCl and excess HF were absorbed, and the organic products condensed. The organic and water layers were separated, and the organic layer was dried with $CaCl_2$ and filtered. Materials exiting the reactor amounted to about 536 g., and about 478 g. of organic compound were recovered. Average HF conversion was about 33 mol percent. The 478 g. of dried and filtered organic products were distilled, and there were recovered as condensate about 129 g. of an oily colorless liquid, identified as $CF_3CF:CClCF_3$ which has a boiling point of about 32° C. On the basis of starting material consumed, conversion of organic starting material to organic products was about 40% by weight, and yield of $CF_3CF:CClCF_3$, based on the amount of starting material converted was 64% by weight. The molecular weight of the oily colorless liquid recovered, by gas density determination, was found to be 219 (216.5, theoretical for $CF_3CF:CClCF_3$). Infrared spectral examination showed the presence of the double bond and the absence of hydrogen, and that the infrared curve was substantially the same as the curve obtained from a sample of $CF_3CF:CClCF_3$ made by zinc reduction of $CF_3CFClCCl_2CF_3$.

$CF_3CF:CClCF_3$ is useful as a solvent, and as an intermediate for organic syntheses for example as starting material for the oxidative production of trifluoroacetic acid.

We claim:

1. The process for making $CF_3CF:CClCF_3$ which comprises subjecting gas-phase $CF_3CCl:CClCF_3$ starting material, at temperature substantially in the range of 425–650° C. and while in the presence of a zirconium tetrafluoride-activated carbon catalyst, to the action of gaseous anhydrous hydrogen fluoride in quantity and for a time sufficient to fluorinate a substantial amount of said starting material and to form a substantial amount of $CF_3CF:CClCF_3$, and recovering $CF_3CF:CClCF_3$ from the resulting reaction products.

2. The process of claim 1 in which temperature is substantially in the range of 425–525° C.

3. The process of claim 1 in which the catalyst contains about 5–40% by weight of $ZrF_4$.

4. The process of claim 1 in which temperature is substantially in the range of 425–525° C., and the operation is carried out in the presence of a relatively small molecular excess of starting material.

References Cited in the file of this patent

UNITED STATES PATENTS 2,714,618      Woolf                 Aug. 2, 1955